(12) United States Patent
Chen

(10) Patent No.: US 9,134,476 B2
(45) Date of Patent: Sep. 15, 2015

(54) LED MODULE WITH LIGHT GUIDING PLATE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 27 days.

(21) Appl. No.: 14/018,433

(22) Filed: Sep. 5, 2013

(65) Prior Publication Data

US 2015/0062964 A1   Mar. 5, 2015

(30) Foreign Application Priority Data

Aug. 27, 2013   (TW) .............................. 102130513 A

(51) Int. Cl.
*F21V 7/04* (2006.01)
*F21V 8/00* (2006.01)

(52) U.S. Cl.
CPC .............. *G02B 6/005* (2013.01); *G02B 6/0053* (2013.01); *G02B 6/0073* (2013.01)

(58) Field of Classification Search
CPC ............................ G02B 6/0073; G02B 6/003

USPC .................................................. 362/608, 612
See application file for complete search history.

(56) References Cited

U.S. PATENT DOCUMENTS 7,422,347 B2 *   9/2008   Miyairi et al. ................. 362/335
2010/0073907 A1 *   3/2010   Wanninger et al. .......... 362/97.1

FOREIGN PATENT DOCUMENTS

JP          2005285667   *   10/2005   ............... F21V 8/00

OTHER PUBLICATIONS

English translation of JP 2005285667.*

* cited by examiner

*Primary Examiner* — Evan Dzierzynski
(74) *Attorney, Agent, or Firm* — Novak Druce Connolly Bove + Quigg LLP

(57) ABSTRACT

An LED module includes an LED, a light guiding plate and a lens. The light guiding plate includes a light incident face confronting the LED, a light diffusion face and a light emerging face. The lens includes an aspheric light incident face and an aspheric light emerging face opposite to the aspheric light incident face. Light emitted from the LED is diffused by the light guiding plate and diverged by the lens to have a wide illumination area.

16 Claims, 5 Drawing Sheets

LED MODULE WITH LIGHT GUIDING PLATE

BACKGROUND

1. Technical Field

The disclosure generally relates to LED (light emitting diode) modules, and more particularly to an LED module having a light guiding plate.

2. Description of Related Art

Nowadays LEDs (light emitting diodes) are applied widely in various applications for illumination. The LED is a highly pointed light source. Thus, light directly emitted from the LED may form a small light spot. However, the small light spot can only illuminate a small area. In order to achieve a large illumination area, a large number of LEDs are required to be incorporated together, thereby resulting in a high cost.

What is needed, therefore, is an LED module with a light guiding plate which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
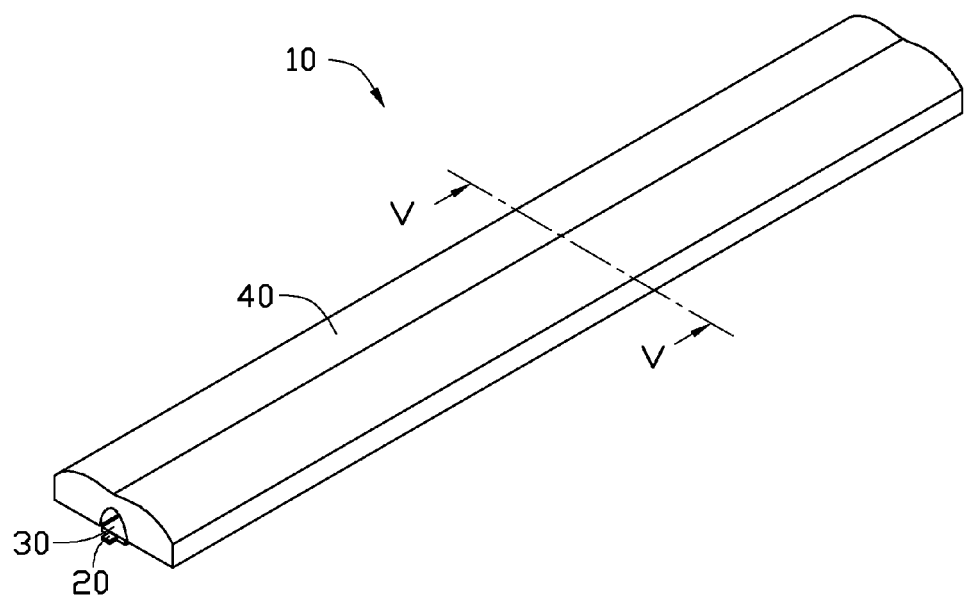
FIG. 1 is an assembled view of an LED module in accordance with an embodiment of the present disclosure.

Referring to FIG. 1, an LED module 10 in accordance with an embodiment of the present disclosure is shown. The LED module 10 includes an LED (light emitting diode) 20, a light guiding plate 30 and a diverging lens 40 covering the light guiding plate 30.

The LED 20 may be made of GaN, InGaN, AlInGaN or other suitable semiconductor materials. The LED 20 can emit visible light when powered. The LED 20 may also have phosphor incorporated therein. Thus, the light emitted from the LED 20 can be changed by the phosphor to have a desired color.

Figure 2:
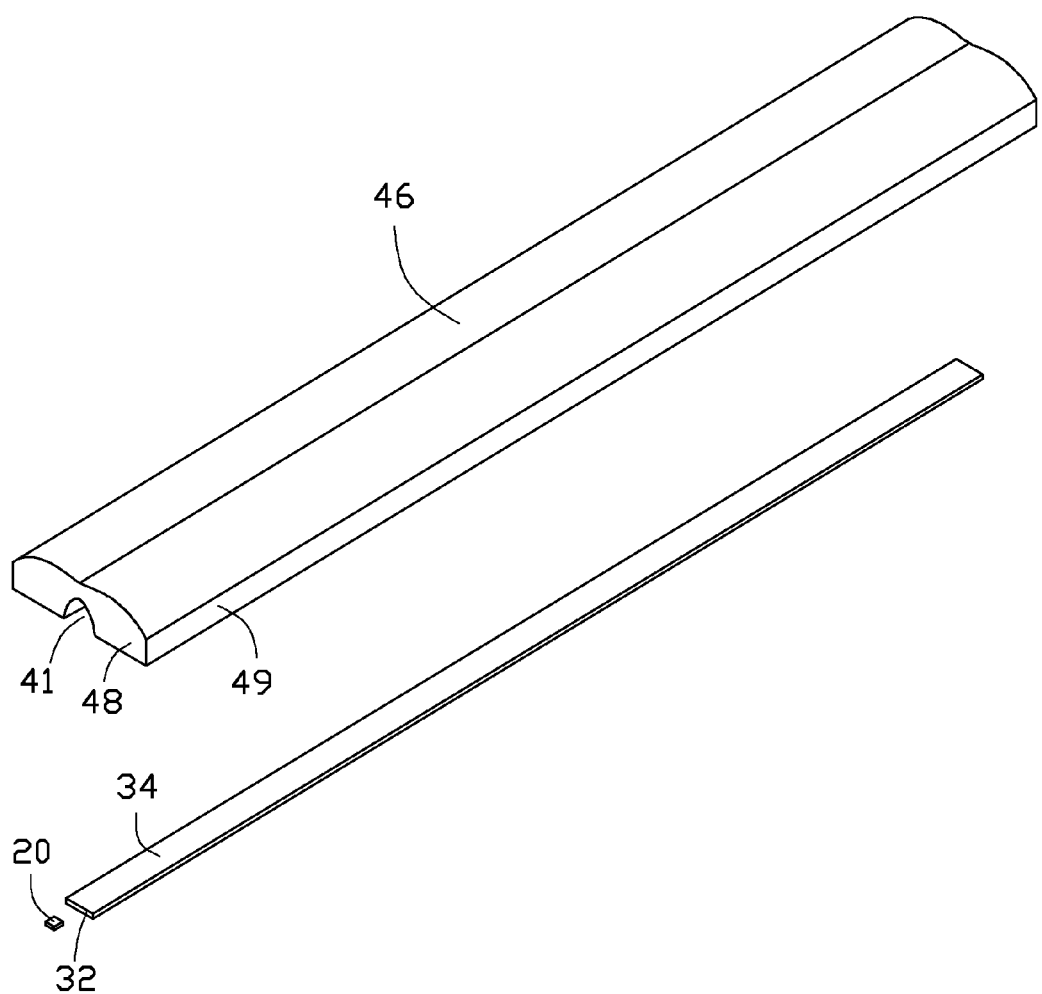
FIG. 2 is an exploded view of the LED module of FIG. 1.
Figure 3:
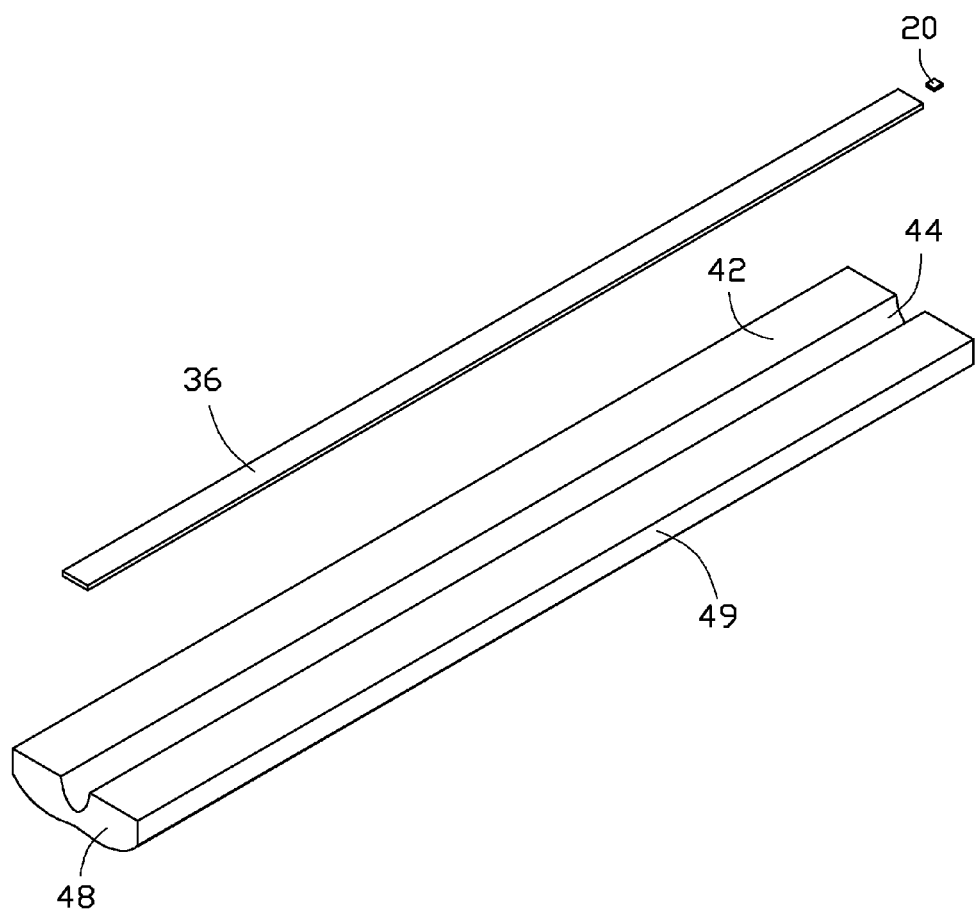
FIG. 3 is an inverted view of the LED module of FIG. 2.

Also referring to FIGS. 2-3, the light guiding plate 30 may be made of polycarbonate, polymethylmethacrylate or other suitable transparent materials. The light guiding plate 30 has an elongated rectangular shape. The light guiding plate 30 includes a light incident face 32, a light diffusion face 36 and a light emerging face 34. The light incident face 32 is located at an end of the light guiding plate 30. The light incident face 32 confronts and directly contacts the LED 20. Thus, the light emitted from the LED 20 can enter the light guiding plate 30 through the light incident face 32. The light diffusion face 36 is located at a bottom of the light guiding plate 30. The light diffusion face 36 may have a large amount of micro protrusions or holes, thereby scattering the light emitted from the light incident face 32 towards the light emerging face 34. The light emerging face 34 is located at a top of the light guiding plate 30. The light emerging face 34 is parallel to the light diffusion face 36 and perpendicular to the light incident face 32. The light incident face 32 is located between the light emerging face 34 and the light diffusion face 36. The light emerging face 34 has an area equal to that of the light diffusion face 36, and larger than that of the light incident face 32. The light incident face 32 and the light emerging face 34 are flat and smooth, and the light diffusion face 36 is flat and rough. Light diffused from the light diffusion face 36 emerges out of the light guiding plate 30 through the light emerging face 34. Since the light is diffused by the light diffusion face 36 within the light guiding plate 30, the whole light emerging face 34 has the light passing therethrough. Thus, the light emerging out of the light guiding plate 30 can have a uniform intensity.

Figure 4:
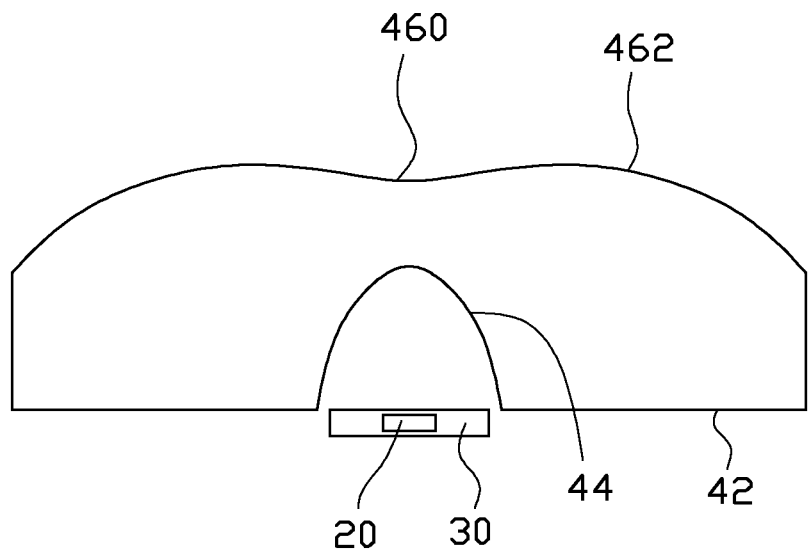
FIG. 4 is a front view of the LED module of FIG. 1.
Figure 5:
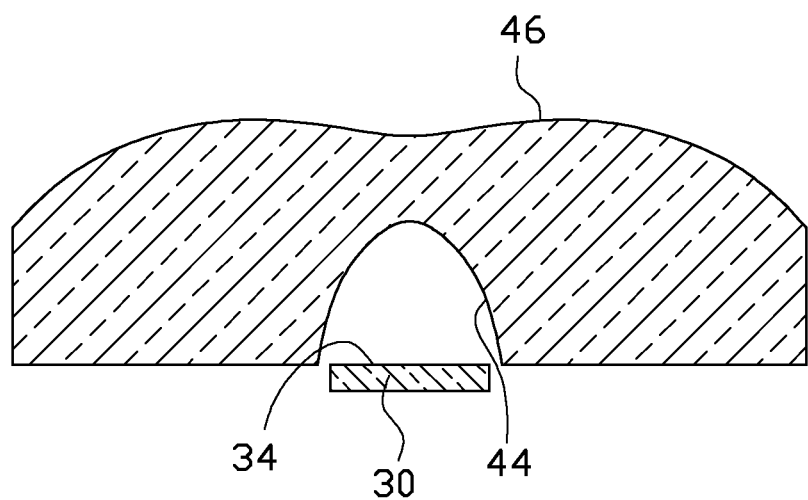
FIG. 5 shows a cross section of the LED module of FIG. 1 taken along line V-V thereof.

Also referring to FIGS. 4-5, the lens 40 is placed above the light guiding plate 30. The lens 40 may be made of the transparent material same as that of the light guiding plate 30. The lens 40 includes a bottom face 42, a light incident face 44 formed in the bottom face 42, a light emerging face 46 opposite to the bottom face 42 and two end faces 48 and two lateral faces 49 interconnecting the bottom face 42 and the light emerging face 46. The lens 40 is elongated and has a constant width along a lengthwise direction thereof. The bottom face 42 of the lens 40 is parallel to the light emerging face 34 of the light guiding plate 30. The light incident face 44 is defined in a central area of the bottom face 42. In this embodiment, the light incident face 44 is an aspheric face. The light incident face 44 confronts the light emerging face 34 of the light guiding plate 30 so that the light emerging out of the light guiding plate 30 can enter the lens 40 through the light incident face 44. The light incident face 44 of the lens 40 has an area larger than that of the light emerging face 34 of the light guiding plate 30. The light incident face 44 encloses a groove 41 in the lens 40. The groove 41 is elongated and extends from one end face 48 to the other end face 48. The groove 41 has a width gradually increasing towards the bottom face 42. A largest width of the groove 41 at the bottom face 42 is larger than a width of the light guiding plate 30. The LED 20 is located outside the groove 41.

The light emerging face 46 is also an aspheric face. The light emerging face 46 includes a curved concave face 460 and two curved convex faces 462 connecting the concave face 460. The concave face 460 and the two convex faces 462 are elongated and parallel to each other. Junctions between the concave face 460 and the two convex faces 462 are curved and smooth. The concave face 460 is located just above the light incident face 44, the two convex faces 462 are located at two opposite sides of the concave face 460. The concave face 460 has a curvature larger than that of the light incident face 44. The light refracted from the light incident face 44 is further diverged by the light emerging face 46 out of the lens 40, thereby achieving a large illumination area. Thus, in order to illuminate a large area, less LEDs 20 are required when use with the light guiding plates 30 and the lenses 40, whereby an illumination cost is reduced accordingly.

The two end faces 48 each connect the concave face 460 and the two convex faces 462 with the bottom face 42, and the two lateral faces 49 each connect a corresponding convex face 462 with the bottom face 42. One end face 48 is parallel to and coplanar with the light incident face 32 of the light guiding plate 30. Each end face 48 has an area less that that of each lateral face 49, and larger than that of the light incident face 32. The two end faces 48 are parallel to each other, and the two lateral faces 49 are also parallel to each other. Each end face 48 is perpendicular to the two lateral faces 49. Reflective films (not visible) may be attached on the two end faces 48 and the two lateral faces 49 for reflecting the light towards the light emerging face 46, thereby increasing a light intensity of the LED module 10.

Both of the aspheric light incident face 44 and the light emerging face 46 of the lens 40 may be defined by a formula expressed as:

$$Z(r) = \frac{cr^2}{1+\sqrt{1-(1+k)c^2r^2}} + a_1r^2 + a_2r^4 + a_3r^6 + a_4r^8 + a_5r^{10} + a_6r^{12} + \ldots,$$

or $$Z(r) = a_1r^1 + a_2r^2 + a_3r^3 + a_4r^4 + a_5r^5 + a_6r^6 + \ldots.$$

In the two formulas, Z(r) represents a depressed degree of a surface, r represents a radius of a hole of the surface, c represents a curvature, k presents a conical coefficient and $a_1$, $a_2$, $a_3$, $a_4$, $a_5$, $a_6$ are constant coefficient.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED (light emitting diode) module comprising:
   an LED;
   a light guiding plate facing a longitudinal end the LED; and
   a diverging lens covering and facing the light guiding plate;
   wherein light emitted from the LED enters the light guiding plate, and is diffused by the light guiding plate and further diverged by the diverging lens out of the LED module;
   wherein the light guiding plate comprises a first light incident face facing the LED and a first light emerging face facing the diverging lens;
   wherein the diverging lens comprises a second light incident face facing the first light emerging face of the light guiding plate, and a second light emerging face opposite to the second light incident face; and
   wherein the second light emerging face comprises a concave face and two convex faces located at two opposite sides of the concave face respectively, and the concave face and the two convex faces of the second light emerging face are elongated faces parallel to each other.

2. The LED module of claim 1, wherein the first light incident face is perpendicular to the first light emerging face.

3. The LED module of claim 2, wherein the light guiding plate comprises a light diffusion face parallel to the first light emerging face.

4. The LED module of claim 3, wherein the first light incident face is located between the first light emerging face and the light diffusion face.

5. The LED module of claim 3, wherein the first light incident face and the first light emerging face are flat and smooth, and the light diffusion face is flat and rough.

6. The LED module of claim 1, wherein the second light incident face and the second light emerging face are aspheric faces.

7. The LED module of claim 1, wherein the second light incident face has an area larger than that of the first light emerging face.

8. The LED module of claim 1, wherein the concave face has a curvature less than the curvature of the second light incident face.

9. The LED module of claim 1, wherein the diverging lens comprises a bottom face facing the first light emerging face of the light guiding plate, the second light incident face enclosing a groove defined in the bottom face.

10. The LED module of claim 9, wherein the second light incident face is located at a central area of the bottom face of the diverging lens.

11. The LED module of claim 9, wherein the diverging lens comprises two opposite end faces and two opposite lateral faces, the groove extending from one end face to the other end face.

12. The LED module of claim 9, wherein the groove is widest at the bottom face of the diverging lens, the largest width of the groove being greater than a width of the light guiding plate.

13. The LED module of claim 9, wherein the LED is located outside the groove.

14. The LED module of claim 1, wherein the light guiding plate and the diverging lens are made of the same transparent material.

15. The LED module of claim 1, wherein the light guiding plate is an elongated rectangular plate.

16. The LED module of claim 1, wherein the diverging lens is elongated and has a constant width along a lengthwise direction thereof.

* * * * *